US012111023B2

(12) United States Patent
Lucassen et al.

(10) Patent No.: US 12,111,023 B2
(45) Date of Patent: Oct. 8, 2024

(54) TUNABLE NARROW-BAND LIGHT SYSTEM HAVING A HIGH CRI ACROSS A WIDE CTT RANGE

(71) Applicant: SIGNIFY HOLDING B.V., Eindhoven (NL)

(72) Inventors: Marcel Petrus Lucassen, Eindhoven (NL); Martinus Petrus Joseph Peeters, Eindhoven (NL); Olexandr Valentynovych Vdovin, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/278,355

(22) PCT Filed: Feb. 14, 2022

(86) PCT No.: PCT/EP2022/053485
§ 371 (c)(1),
(2) Date: Aug. 22, 2023

(87) PCT Pub. No.: WO2022/179871
PCT Pub. Date: Sep. 1, 2022

(65) Prior Publication Data

US 2024/0133526 A1 Apr. 25, 2024
US 2024/0230039 A9 Jul. 11, 2024

(30) Foreign Application Priority Data

Feb. 23, 2021 (EP) .................................... 21158694
Mar. 9, 2021 (EP) .................................... 21161548

(51) Int. Cl.
*F21K 9/64* (2016.01)
*F21K 9/65* (2016.01)
(Continued)

(52) U.S. Cl.
CPC .................. *F21K 9/64* (2016.08); *F21K 9/65* (2016.08); *F21V 23/0442* (2013.01);
(Continued)

(58) Field of Classification Search
CPC .......... F21K 9/64; F21K 9/65; F21Y 2113/10; F21Y 2115/10; F21Y 2115/30; F21Y 2113/13; F21V 23/0442; H01L 33/504
See application file for complete search history.

(56) References Cited

U.S. PATENT DOCUMENTS

2009/0122530 A1 5/2009 Beers et al.
2016/0007422 A1 1/2016 Zukauskas et al.
(Continued)

FOREIGN PATENT DOCUMENTS

CN 102869914 A * 1/2013 ......... C09K 11/7734
EP 2985519 A1 2/2016
(Continued)

OTHER PUBLICATIONS

Search English translation of CN-102869914-A (Year: 2013).*
(Continued)

*Primary Examiner* — Omar Rojas Cadima

(57) ABSTRACT

The invention provides a light generating system (1000) configured to generate in an operational mode system light (1001) having a spectral power distribution with at least 85% of the spectral power in emission bands (111, 121, 131, 141) in four basic wavelength ranges of each at maximum 50 nm width, of which at least three of the four basic wavelength ranges are selected from a first wavelength range of 452 nm+/−25 nm, a second wavelength range of 504 nm+/−25 nm, a third wavelength range of 560 nm+/−25 nm, and a fourth wavelength range of 617.5 nm+/−25 nm, wherein the emission bands (111, 121, 131, 141) have full width half maxima of at maximum 30 nm.

15 Claims, 6 Drawing Sheets

(51) Int. Cl.

| | |
|---|---|
| ***F21V 23/04*** | (2006.01) |
| *F21Y 113/10* | (2016.01) |
| *F21Y 115/10* | (2016.01) |
| *F21Y 115/30* | (2016.01) |

(52) U.S. Cl.

CPC ........ *F21Y 2113/10* (2016.08); *F21Y 2115/10* (2016.08); *F21Y 2115/30* (2016.08)

(56) References Cited

U.S. PATENT DOCUMENTS

| | | | |
|---|---|---|---|
| 2018/0132329 | A1 | 5/2018 | Yan et al. |
| 2018/0153016 | A1 | 5/2018 | Van Bommel et al. |
| 2020/0045787 | A1 | 2/2020 | Nolan et al. |

FOREIGN PATENT DOCUMENTS

| | | | | |
|---|---|---|---|---|
| WO | 2013150455 | A1 | 10/2013 | |
| WO | WO-2013150413 | A1 * | 10/2013 | ........... H01L 33/504 |
| WO | 2015014936 | A1 | 2/2015 | |
| WO | 2019036204 | A1 | 2/2019 | |

OTHER PUBLICATIONS

A. Neumann, et al., "Fouor-Color Laser White Illuminant Demonstrating High Color-Rendering Quality", Optics Express, Jul. 1, 2011, vol. 19, No. S4, pp. A982-A990.

* cited by examiner

TUNABLE NARROW-BAND LIGHT SYSTEM HAVING A HIGH CRI ACROSS A WIDE CTT RANGE

CROSS-REFERENCE TO PRIOR APPLICATIONS

This application is the U.S. National Phase application under 35 U.S.C. § 371 of International Application No. PCT/EP2022/053485, filed on Feb. 14, 2022, which claims the benefits of European Patents Applications Nos. 21161548.9, filed on Mar. 9, 2021 and 21158694.6, filed on Feb. 23, 2021. These applications are hereby incorporated by reference herein.

FIELD OF THE INVENTION

The invention relates to a light generating system and to a light generating device comprising such light generating system.

BACKGROUND OF THE INVENTION

Illumination systems are known in the art. US2009/0122530, for instance, describes solid state illumination systems which provide—according to US2009/0122530—improved color quality and/or color contrast. The systems provide total light having delta chroma values for each of the fifteen color samples of the color quality scale that are preselected to provide—according to US2009/0122530—enhanced color contrast relative to an incandescent or black-body light source, in accordance with specified values which depend on color temperature. Illumination systems provided in US2009/0122530 may comprise one or more organic electroluminescent element, or they may comprise a plurality of inorganic light emitting diodes, wherein at least two inorganic light emitting diodes have different color emission bands.

SUMMARY OF THE INVENTION

Lighting devices based on the RGB principle are known in the art. There appears to be a need for high brightness light sources for general lighting, with a high demand on color quality and color rendering. An option may be the use of LED-based lighting devices. Although color tunable LED-based light sources are available, they may be limited in one or more of in brightness, beam angle and color tuneability range. Therefore, it may be desirable to propose an alternative lighting device, preferably with a high color quality. An option may be the use of laser-based lighting devices. However, narrow-band light emitters ignore the largest part of the visible wavelength range. This may make the color quality of the (white) light generated with the laser-based lighting device heavily dependent on the choice of the peak emission wavelengths. Hence, there is a desire to provide a lighting device that provides light, especially color tunable light, that has a high CRI.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

In an aspect, the invention provides a light generating system configured to generate in an operational mode system light. Especially, the system light may have a spectral power distribution with at least 75%, especially at least 85%, of the spectral power (such as in Watts) in emission bands, especially in four basic wavelength ranges. In embodiments, the four basic wavelength ranges may each be of at maximum 50 nm width. In specific embodiments, at least three of the four basic wavelength ranges may be selected from (i) a first wavelength range of 452 nm+/−25 nm, (ii) a second wavelength range of 504 nm+/−25 nm, (iii) a third wavelength range of 560 nm+/−25 nm, and (iv) a fourth wavelength range of 617.5 nm+/−25 nm. Further, in specific embodiments the emission bands may have full width half maxima of at maximum 30 nm. Hence, in embodiments the invention provides a light generating system configured to generate in an operational mode system light having a spectral power distribution with at least 85% of the spectral power in emission bands in four basic wavelength ranges of each at maximum 50 nm width, of which at least three of the four basic wavelength ranges are selected from a first wavelength range of 452 nm+/−25 nm, a second wavelength range of 504 nm+/−25 nm, a third wavelength range of 560 nm+/−25 nm, and a fourth wavelength range of 617.5 nm+/−25 nm, wherein the emission bands have full width half maxima of at maximum 30 nm.

With such light generating system, the color rendering may be high over a large range of the correlated color temperature (CCT). For instance, the color rendering index (CRI) may be at least 80, like at least 85, or even over 90. Hence, the present invention allows a system with system light with a high CRI/color rendering properties. Yet further, the invention allows a system with system light with a high color rendering properties and with variable optical properties. Further, the invention provides a system which may provide high intensity (system) light. Yet further, when using narrow-band light sources, such as laser, it may be easier to transport the light via e.g. fibers. Further, beam shaping and light control may be easier. With narrow-band emitters, like laser, it may also be easier to oversaturate colors. So, the reproduced colors may have higher saturation than when reproduced under a broadband spectrum of the same CCT. It appears that some oversaturation (wherein the color gamut index ($G_a$) may be larger than 100) may be desirable. Additionally, color sensing deficient people (e.g. color blind people) may also benefit from higher color saturation because it may help to better discriminate colors.

As indicated above, the invention provides a light generating system configured to generate in an operational mode system light. The fact that the system may provide system light in an operational mode, does not exclude that the system may be able to generate system light (in one or more other operational modes) not complying with the herein described conditions for the system light. However, it may also be possible that the system may be operated in one or more operational modes wherein the system light always complies with the herein described conditions for the system light. Hence, in specific embodiments the system may be configured to generate system light having a fixed spectral power distribution. In other specific embodiments, the system may be configured to generate in one or more operational modes system light complying with the herein described conditions for the system light. In yet other specific embodiments, the system may be configured to generate in one or more operational modes system light complying with the herein described conditions for the system light, and in one or more other operational modes system light not complying with the herein described conditions for the system light.

The system, or apparatus, or device may execute an action in a "mode" or "operation mode" or "mode of operation" or "operational mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though e.g. other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In embodiments, the control system may be configured to control the spectral power distribution in dependence of a sensor signal. Alternatively or additionally, the control system may be configured to control the spectral power distribution in dependence of a user device, such as a smartphone, such as via Bluetooth.

As indicated above, especially the system is configured to generate in an operational mode system light having a spectral power distribution with at least 75% of the spectral power in (the) emission bands, even more especially at least 80% of the spectral power in emission bands, yet even more especially at least 85% of the spectral power in (the) emission bands (or even at least 90%). Hence, up 25%, such as up to 20%, like up to about 15% (or even at maximum 10%) of the spectral power may be in other emission band, e.g. in other wavelength ranges and/or having a larger full width half maximum (FWHM) (see also below). Here, the percentage(s) especially refer to energy units, like e.g. Watt. Further, these percentage may especially refer to the visible wavelength range.

The terms "visible", "visible light" or "visible emission" and similar terms refer to light having one or more wavelengths in the range of about 380-780 nm.

Hence, especially the system is configured to generate in an operational mode system light having a spectral power distribution with at least 75%, like at least 85% (see above), of the spectral power in emission bands, relative to the total spectral power in the visible wavelength range (of 380-780 nm). Especially, in embodiments the spectral power within each of the (four) emission bands may be larger than the spectral power not in these emission bands. Hence, especially the system may be configured to generate in an operational mode system light having a spectral power distribution with more than 80% of the spectral power (within the visible wavelength range) in the emission bands. Here, the percentage(s) (also) especially refer to energy units, like e.g. Watt.

The position of the emission bands may not be freely selectable. It surprisingly appears that there are at least two, more especially at least three wavelength ranges wherein at least two, or at least three, respectively, emission bands have to be chosen. Further, it appears that when further optimizing with e.g. a fourth emission band, the position of the wavelength ranges of the other emission band may be even more fixed. Hence when chosen two out of four, more especially three out of four, yet even more especially all four from four predefined wavelength ranges, a high CRI may be obtained, while also a high intensity light source may be provided, and CCT tunability may be relatively broad. These wavelength ranges, which may also indicated a "basic wavelength ranges", may be a first wavelength range of 452 nm+/−25 nm, a second wavelength range of 504 nm+/−25 nm, a third wavelength range of 560 nm+/−25 nm, and a fourth wavelength range of 617.5 nm+/−25 nm. Hence, spectral power within the wavelength range of 380-780 nm, but outside these four basic wavelength ranges is in embodiments at maximum 25% of the total spectral power (within the 380-780 nm) wavelength range, especially at maximum 20%, yet more especially at maximum 15%. Even more especially, spectral power within the wavelength range of 380-780 nm, but outside these four basic wavelength ranges is in embodiments at maximum 10% of the total spectral power (within the 380-780 nm) wavelength range.

Therefore, in embodiments the system may especially be configured to generate in an operational mode system light having a spectral power distribution with at least 85% of the spectral power in emission bands in four basic wavelength ranges of each at maximum 50 nm width, of which at least three of the four basic wavelength ranges may be selected from a first wavelength range of 452 nm+/−25 nm, a second wavelength range of 504 nm+/−25 nm, a third wavelength range of 560 nm+/−25 nm, and a fourth wavelength range of 617.5 nm+/−25 nm.

Here below, some further embodiments are described.

The respective emission bands (in the respective basic wavelength ranges) may especially be relatively narrow emission bands. In embodiments, one or more of the emission bands, such as two or more, especially all, have a single maximum. This will generally be the case with e.g. laser emissions. For instance, in embodiments one or more of the emission bands, such as two or more, especially all, may have a substantially Gaussian shape. However, other shapes may also be possible. In embodiments it may also be possible that an emission band may comprise two or more overlapping (smaller) emission bands, which together form an emission band, for instance with a single maximum. This may e.g. be the case when using for instance quantum dots. In embodiments, such emission band may have a substantially Gaussian shape. However, other shapes may also be possible. In embodiments, one or more of the (four) emission bands (in the respective basic wavelength ranges) may comprise two or more overlapping (smaller) emission bands.

Especially, one or more, such as two or more, especially all emission bands may be relatively narrow, such as a FWHM of at maximum 30 nm. Larger FWHMs may lead to a high CRI while allowing a relatively broad CCT tunability. Hence, in embodiments the emission bands have full width half maxima of at maximum 30 nm, such as in specific embodiments up to about 15 nm. Especially, in embodiments one or more of the emission bands have a full width half maximum of at maximum 25 nm. Full widths half maximum of smaller than about 5 nm, such as smaller than about 5 nm, may provide CRIs slightly lower than with a FWHM of about 10 nm, but may still provide relatively high CRIs. Hence, especially the FWHM may be selected from the range of up to about 25 nm, such as selected from the range of about 0.5-25 nm, even more up to about 20 nm, such as especially selected from the range of up to about 16 nm. In specific embodiments, the FWHM may be selected from the range of about up to about 14 nm, such as selected from the range of 0.5-15 nm, like at least about 1 nm. Hence, in embodiments the emission bands may have full width half maxima selected from the range of up to about 25 nm, like selected from the range of 0.5-25 nm. Note that the FWHMs for different bands may be differently (but all may in embodiments be selected from the range of up to about 30 nm, such as up to about 25 nm).

In specific embodiments, one or more of the emission bands, like two or more, such as three or more, especially all four, have full width half maxima of at maximum 5 nm, such as smaller than 5 nm.

In yet other specific embodiments, one or more of the emission bands, like two or more, such as three or more, especially all four, have full width half maxima of at minimum 5 nm, such as at least 10 nm.

Yet further, in embodiments it may also be possible that in a basic wavelength range there are two or more different emission bands that (spectrally) partly overlap or that do not overlap. In such embodiments, in a basic wavelength range there may be two or more maxima. These two or more emission bands may together form the spectral power distribution of the respective basic wavelength range. In such embodiments, each of the two or more different emission bands may comply with the condition of the full width half maximum of at maximum 30 nm (or less). Further, the peak maxima of the lowest energetic emission band in the basic wavelength range and the highest energetic emission band in the basic wavelength range may have a (spectral) distance of not larger than the full width half maximum of at maximum 30 nm. Even more especially, at least 75% of the spectral power of the two or more different emission bands may be found within a 25 nm wavelength range, such as within a 20 nm wavelength range, or even within a 15 nm wavelength range within the basic wavelength range. In such instance, the bands may still provide a relative narrow emission. For instance, this may be the case when using two lasers having maxima differing e.g. 10 nm from each other. In embodiments, one or more of the (four) emission bands (in the respective basic wavelength ranges) may effectively be provided by two or more partly overlapping or non-overlapping (smaller) emission bands.

As indicated above, in embodiments at least three of the four basic wavelength ranges may be selected from the first wavelength range of 452 nm+/−25 nm, the second wavelength range of 504 nm+/−25 nm, the third wavelength range of 560 nm+/−25 nm, and the fourth wavelength range of 617.5 nm+/−25 nm. Best results may be obtained when at least emission band in the first three listed basic wavelength ranges are available. Hence, especially in embodiments at least three of the four basic wavelength ranges may be selected from the first wavelength range of 452 nm+/−25 nm, the second wavelength range of 504 nm+/−25 nm, and the third wavelength range of 560 nm+/−25 nm. Even more especially, all (the) four basic wavelength ranges may be selected from the first wavelength range of 452 nm+/−25 nm, the second wavelength range of 504 nm+/−25 nm, the third wavelength range of 560 nm+/−25 nm, and the fourth wavelength range of 617.5 nm+/−25 nm.

Especially, the four basic wavelength ranges (of which three or especially four are chosen) may be centered around about 452 nm, 504 nm, 560 nm, and 617.5 nm, respectively. Hence, specific embodiments the four basic wavelength ranges are selected from a first wavelength range of 452 nm+/−20 nm, a second wavelength range of 504 nm+/−20 nm, a third wavelength range of 560 nm+/−20 nm, and a fourth wavelength range of 617.5 nm+/−20 nm. In such embodiments, one or more of the four basic wavelength ranges, especially at least all of the four, may each have a width of at maximum 40 nm.

Especially, in embodiments the system may be configured to generate in an operational mode system light having a spectral power distribution with at least 75%, like at least 85% (see above), of the spectral power in emission bands, relative to the total spectral power in the visible wavelength range (of 380-780 nm), wherein the emission bands are within the (basic) wavelength ranges selected from a first wavelength range of 452 nm+/−20 nm, a second wavelength range of 504 nm+/−20 nm, a third wavelength range of 560 nm+/−20 nm, and a fourth wavelength range of 617.5 nm+/−20 nm. Hence, in specific embodiments the respective centroid wavelengths (see also below) may be selected from a first wavelength range of 452 nm+/−20 nm, a second wavelength range of 504 nm+/−20 nm, a third wavelength range of 560 nm+/−20 nm, and a fourth wavelength range of 617.5 nm+/−20 nm.

In specific embodiments the four basic wavelength ranges are selected from a first wavelength range of 452 nm+/−15 nm, a second wavelength range of 504 nm+/−15 nm, a third wavelength range of 560 nm+/−15 nm, and a fourth wavelength range of 617.5 nm+/−15 nm. In such embodiments, one or more of the four basic wavelength ranges, especially at least all of the four, may each have a width of at maximum 30 nm. For instance, in such embodiments the FWHM (of the light source) may be about at maximum 25 nm, such as at maximum about 15 nm. Hence, in further specific embodiments the respective centroid wavelengths (see also below) may be selected from a first wavelength range of 452 nm+/−15 nm, a second wavelength range of 504 nm+/−15 nm, a third wavelength range of 560 nm+/−15 nm, and a fourth wavelength range of 617.5 nm+/−15 nm.

Even more especially, in embodiments the four wavelength ranges may be selected from a first wavelength range of 452 nm+/−10 nm, a second wavelength range of 504 nm+/−12 nm, a third wavelength range of 560 nm+/−11 nm, and a fourth wavelength range of 617.5 nm+/−13 nm. Especially, in embodiments 452 nm+/−7 nm.

Hence, in further specific embodiments the respective centroid wavelengths (see also below) may be selected from a first wavelength range of 452 nm+/−10 nm, a second wavelength range of 504 nm+/−12 nm, a third wavelength range of 560 nm+/−11 nm, and a fourth wavelength range of 617.5 nm+/−13 nm.

In further specific embodiments, the four wavelength ranges are selected from a first wavelength range of 452 nm+/−5 nm, a second wavelength range of 504 nm+/−5 nm, a third wavelength range of 560 nm+/−5 nm, and a fourth wavelength range of 617.5 nm+/−5 nm. Especially, the FWHM may be selected from the range of up to 30 nm, such as up to 25 nm.

Hence, in further specific embodiments the respective centroid wavelengths (see also below) may be selected from a first wavelength range of 452 nm+/−5 nm, a second wavelength range of 504 nm+/−5 nm, a third wavelength range of 560 nm+/−5 nm, and a fourth wavelength range of 617.5 nm+/−5 nm. Especially, the FWHM may be selected from the range of up to 30 nm, such as up to 25 nm.

Herein, the term full width half maximum as well as the peak positions, may especially refer to the full width half maximum or peak position at maximum operation. This may e.g. be at temperatures for lasers at e.g. about 40-70° C., though other temperatures may also be possible. For luminescent materials, the temperature may be in the range of 20-200° C., though other temperatures may also be possible.

As indicated above, in embodiments at least 85% of the spectral power in emission bands in four basic wavelength ranges of each at maximum 50 nm width. In yet further specific embodiments the light generating system is configured to generate in the operational mode system light having a spectral power distribution with at least 95% of the spectral power in the emission bands (in the four basic wavelength ranges). Especially, with such conditions a high CRI may be obtained, while also a high intensity light source may be provided.

To provide the system light, the system may comprise a plurality of sources of light. In embodiments, different light sources are applied, especially laser light sources. In (other) embodiments, one or more narrow band emission materials may be applied, which may optionally be comprised in a single light source. Such single light source may thus be a source of a single type of light in a single basic wavelength range, or of more than one type of light in two or more different basic wavelength ranges. Hence, in embodiments the system may comprise four sources of light configured to generate the (respective) emission bands.

Here below, first some aspects in relation to light sources are described.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In embodiments, the term "laser" may refer to a multimode laser diode. In other embodiments, the term "laser" may refer to a single mode laser diode. In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3:Cr^{3+}$), thulium YAG (Tm:YAG) laser, titanium sapphire (Ti:sapphire; $Al_2O_3:Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths. To contain upconversion or downconversion, also non-linear optics may be applied. Further, also an OPA (optical parametric amplifier) may be applied, such as to create the desired wavelengths and/or wavelength distributions, on the basis of another light source, such as a laser light source.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments$\leq 2°$ (FWHM), more especially$\leq 1°$ (FWHM), most especially $\leq 0.5°$ (FWHM). Hence, $\leq 2°$ (FWHM) may be considered (highly) collimated light source light. Optics may be used to provide (high) collimation (see also above).

In specific embodiments, the light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually.

In specific embodiments one or more of the four sources of light may comprise laser light sources. More especially, in embodiments two or more of the four sources of light (comprise laser light sources, yet even more especially all of the four sources of light comprise laser light sources. Note that the term "laser light source" may in embodiments refer to a plurality of laser light sources of the same bin. However, in other embodiment the term "laser light source" may also refer to a plurality of (slightly) different laser light sources (such as with peak maxima of the lowest energetic emission band in the basic wavelength range and the highest energetic emission band in the basic wavelength range may have a (spectral) distance of not larger than the full width half maximum of at maximum 30 nm; see further above).

Instead of or in addition to laser light sources, also quantum structure based light sources may be used. Quantum structure based light sources may comprise light sources that use the quantum structure as primary source of light, like a quantum dot laser. Alternatively or additionally, quantum structure based light sources may comprise light sources that use the quantum structure as secondary source of light. In such embodiments, a (primary) light source may generate light source light that is at least partly converted by the quantum structure into converted light. In such embodiments, the quantum structure is used as luminescent material. Hence, the term "phosphor" may also refer to a quantum structure (that may be used as luminescent material).

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, quantum structures may comprise 2D or 3D arrangements of structures or matter, thereby providing the quantum structure(s), as known in the art. Further, in embodiments quantum structures may comprise semiconductor nanoparticles, such as quantum dots, as known in the art (see e.g. WO2013150455 or WO2013057702).

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

For instance, in embodiments one or more of the four sources of light comprise quantum structure based light sources. Especially, in embodiments one or more of the four sources of light comprise quantum dot based light sources, like a laser light source with quantum dots as luminescent material, which convert at least part of the laser light into (quantum dot) luminescent material light.

As indicated above, in embodiments the system may comprise four sources of light configured to generate the (respective) emission bands.

In a first extreme case, the four sources of light may be based on a single type of light source which emits one or more (broad bands). Together with optics, the (four) emission bands may be selected. In a second similar extreme, the four sources of light may be based on a single type of light source which emits the (four) emission bands having the desired band widths ("emission band width") and in the desired basic wavelength ranges ((four) sources of light). For instance, a light source may be used, configured to generate light source light, of which at least part is converted into luminescent material light. This may provide, optionally in combination with (first) optics, to the (four) emission bands. For purposes of controllability of the spectral power distribution, a type of light source, optionally in combination with first optics, may essentially provide not more than two of the sources of light. In yet a third (differently) extreme case, (four) different light sources provide (optionally together with first optics) the respective (four) emission bands having the desired band widths and in the desired basic wavelength ranges ((four) sources of light). This may provide a maximum controllability of the system light. Note that such sources of light may be based on conversion or may not be based on conversion. For instance, one or more sources of light may selected from the group comprising a laser diode, a quantum-structure based light source. In embodiments, one or more light source may be based on a conversion of luminescent material light with one or more f-f transitions of a (trivalent) lanthanide ion, optionally in combination with first optics to filter out undesired (f-f transitions).

Hence, especially the light generating system may comprise two or more different types of light sources (optionally in combination with a luminescent material and/or first optics) which are configured as respective source of light. Hence, especially there may be four different light sources, which optionally in combination with a luminescent material and/or first optics, are configured as respective source of light of the four sources of light. The (four) light sources may individually be controlled by a control system (see also elsewhere herein). The phrase "different light sources", and similar phrases, may refer to light sources that generate light source light having different spectral power distribution but may also refer to light sources that generate light source light having essentially the same spectral power distribution, but which are used for different sources of light, like e.g. a blue laser diode for the blue component, and the same type blue for a red component as the blue laser light is converted by a luminescent material into red luminescence.

Would a source of light have a too broad emission band width and/or a less desirable spectral power distribution, it may be possible to use optics to modify the spectral power distribution of the source of light (see also above). For instance, one or more of a grating, a bandpass filter, a dichroic filter, a monochromatic filter, a longpass filter, a shortpass filter, a dispersion element (like a prism) (with an optics e.g. a slit, to select the desired wavelengths (like in monochromators) etc. Such optics are herein indicated as "first optics". One or more, such as two or more of such (first) optics may be applied. In embodiments, the first optics may be configured to narrow the beam width of the respective source of light. Note that the term "first optics" may also refer to a plurality of (such) optics.

Hence, instead of sources of light that may have a relative narrow band by nature, such as can be the case with lasers and quantum dots, also other sources of light may be applied, which, together with the first optics, may provide a source of light having a suitable spectral power distribution (including in embodiments the desired band width). Likewise, instead of sources of light that may have the spectral power distribution at about the right position, also other sources of light may be applied, which, together with the first optics, may provide a source of light having a suitable spectral power distribution (including in embodiments within one of the indicated basic wavelength range).

In embodiments, also one or more LEDs, or phosphor converted LEDs, or superluminescent, may be applied. Especially, in embodiments of the light generating system one or more of the four sources of light comprise a light source selected from a LED, a phosphor converted LED, and a superluminescent diode, optionally in combination with first optics, wherein the first optics are configured to narrow the beam width of the respective source of light.

Hence, for instance as source of light a narrow-band LED may be applied but also a broad-band LED with one or more additional optical filters (to narrow down the emission spectrum) may be applied.

With above-mentioned sources of light, it may be possible to provide in embodiments four emission bands which may have relatively narrow band widths.

In specific embodiments, the system may comprise one or more of (a) a first source of light configured to generate the first emission band having a centroid wavelength selected from the wavelength range of 442-462 nm, (b) a second source of light configured to generate the second emission band having a centroid wavelength selected from the wavelength range of 499-509 nm, (c) a third source of light configured to generate the third emission band having a centroid wavelength selected from the wavelength range of 549-571 nm, and (d) a fourth source of light configured to generate the fourth emission band having a centroid wavelength selected from the wavelength range of 604-631 nm. Hence, in specific embodiments the system comprises a first source of light is configured to generate the first emission band having a centroid wavelength selected from the wavelength range of 442-462 nm, wherein a second source of light is configured to generate the second emission band having a centroid wavelength selected from the wavelength range of 499-509 nm, wherein a third source of light is configured to generate the third emission band having a centroid wavelength selected from the wavelength range of 549-571 nm, wherein a fourth source of light is configured to generate the fourth emission band having a centroid wavelength selected from the wavelength range of 604-631 nm.

In specific embodiments, the system may comprise one or more of (a) a first source of light configured to generate the first emission band having a centroid wavelength selected from the wavelength range of 449-455 nm, (b) a second source of light configured to generate the second emission band having a centroid wavelength selected from the wavelength range of 499-509 nm, (c) a third source of light configured to generate the third emission band having a centroid wavelength selected from the wavelength range of 555-565 nm, and (d) a fourth source of light configured to generate the fourth emission band having a centroid wavelength selected from the wavelength range of 612-623 nm. Hence, in specific embodiments the system comprises a first source of light is configured to generate the first emission band having a centroid wavelength selected from the wavelength range of 449-455 nm, wherein a second source of light is configured to generate the second emission band having a centroid wavelength selected from the wavelength range of 499-509 nm, wherein a third source of light is configured to generate the third emission band having a centroid wavelength selected from the wavelength range of 555-565 nm, wherein a fourth source of light is configured to generate the fourth emission band having a centroid wavelength selected from the wavelength range of 612-623 nm.

The term "centroid wavelength", also indicated as $\lambda c$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at (maximum) operation conditions.

The system may further comprise optics (see also above). The term "optics" may especially refer to (one or more) optical elements. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics. See further above for examples of optics.

Especially, the system may comprise optics to combine the light of different sources of light (when these are spatially separated generated). Hence, two or more beams of different sources may be combined into a single beam using optics. Such optics are herein indicated as "second optics". One or more, such as two or more of such (second) optics may be applied. Note that when quantum structures are applied, such optics or less of such second optics may be necessary, as e.g. a single light source may provide two sources of light (e.g. two different types of quantum dots emitting in different basic wavelength ranges). In embodiments, the second optics may be selected from the group of a dichroic mirror, a dichroic cube, and a diffractive optical element. Optionally, the second optics maybe provided using a holographic element. Yet, alternatively or additionally, the second optics may comprise a polarization beam combiner, a mixing rod, a light pipe, a light guide, etc. Especially, the dichroic element may be a dichroic mirror or reflector. Hence, in embodiments the light generating system may further comprise second optics, configured to combine two or more beams of light of two or more of the four sources of light.

Especially, the system is configured to generate system light. In embodiments, the system light may escape from the system as a beam of light. Further, in embodiments the system may comprise optics which are configured downstream of the sources of light, and which optics may e.g. be configured to shape the beam of light and/or to mix the different sources of light. Such optics are herein indicated as "third optics". One or more, such as two or more of such (third) optics may be applied. Hence, in embodiments the light generating system may further comprise third optics configured downstream of the sources of light, wherein the third optics may comprise a beam shaping element selected from the group of diffusors and collimators, or other optical elements, such as comprising lenses, reflectors, etc. (see also above). In embodiments, the third optics may comprise one or more of beam expander optics and zoom lens optics. Third optics may e.g. be applied to mix beams of light. Further, the spatial power distribution, the angular distribution, and the color homogeneity may be influenced with the third optics.

Note that the terms "second optics" and "third optics" may each individually also refer to a plurality of (such) optics.

Hence, in embodiments the light generating system may further comprise second optics, configured to combine two or more beams of light of two or more of the four sources of light, and third optics configured downstream of the sources of light, wherein the third optics comprises a beam shaping element selected from the group of diffusors and collimators.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The system light has a spectral power distribution. In specific embodiments, the spectral power distribution may be controllable. To this end, there may be at least one source of light that is controllable, especially two or more sources of light that are controllable. Hence, in embodiments one or more of the sources of light may be controllable, especially two or more sources of light may be individually controllable. Especially, all (available) sources of light may be (individually) controllable. In this way, e.g. one or more of the spectral power distribution, the color rendering index, the color point, and the correlated color temperature of the system light may be controllable. Therefore, especially, the light generating system may (further) comprising a control system. In embodiments, the control system may be configured to control one or more of the spectral power distribution, the color rendering index, the color point, and the correlated color temperature of the system light.

For instance, in embodiments the control system is configured to control one or more of the spectral power distribution, the color rendering index, and the color point, of the system light while maintaining the correlated color temperature within a range of 1800-6500 K, such as 2000-6500 K, like especially about 2700-6500 K. In (other) embodiments, embodiments the control system is configured to control one or more of the spectral power distribution, the correlated color temperature, and the color point, of the system light while maintaining the color rendering index at at least 75, more especially at at least 80, such as in specific embodiments at at least 85. Especially, in embodiments the CCT may be controllable over a range of at least 500 K, such as at least 1000 K, even more especially at least 2000 K, yet even more especially at least 3500 K, such as in specific embodiments over the entire range of 2700-6500 K. In specific embodiments, the CRI may be at least 90, over a large CCT range, such as even over about 2700-6500 K. CRI values of over 90, like such as over 94, or even at least 95, may also be possible.

Especially, in embodiments the control system may be configured to control one or more of the spectral power distribution, the color rendering index, the color point, and the correlated color temperature of the system light in dependence of a sensor signal of a sensor, wherein the sensor comprises an optical sensor. The optical sensor may comprise one or more photodiodes, optionally in combination with (different) optical filters upstream of the one or more photodiodes. In embodiments, the sensor may include a monochromator, to sense a specific wavelength.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

In specific embodiments, the system may be configured to generate white system light in the operational mode. As indicated above, e.g. the CCT of the white system light may (in embodiments) be controllable. The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, (a disinfection device, and an optical wireless communication device), comprising the light generating system as defined herein. The light generating device may comprise a housing or a carrier, configured to house or support, one or more elements of the light generating system. For instance, in embodiments the light generating device may comprise a housing or a carrier, configured to house or support one or more of a light source, optics, a controller, etc.

As indicated above, the invention provides in embodiments a tunable narrow-band light system having a high CRI across a wide CCT range.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

It appeared possible that a light source composed of four laser wavelengths can produce white light having a color rendering index in the range 80-90. Not only lasers can produce very narrow-band emission of light. Quantum dots, and certain LEDs with a specific phosphor combination may have the same property. An advantage of narrow-band light over broad-band light appear to be a gain in the luminous efficacy of the radiation. Another advantage of laser-based light sources is the intrinsic high brightness of lasers due to their small emitting areas and beam divergence. Hence, it appears desirable to implement such narrow-band emitters. Further, there appears to be a potential need for high brightness light sources for general lighting, with a high demand on color quality and color rendering. Although color tunable LED-based light sources are available, they may be limited in brightness, beam angle and color tuneability range. Therefore, it appears desirable to use e.g. a full laser-based light source to provide the best possible color quality. However, narrow-band light emitters ignore the largest part of the visible wavelength range, which makes color quality heavily dependent on the choice of the peak emission wavelengths.

However, by e.g. a smart selection of the four wavelengths in a 4-wavelength light, it appears possible to maximize the color rendering index and the tunability of the CCT.

Figure 1A:
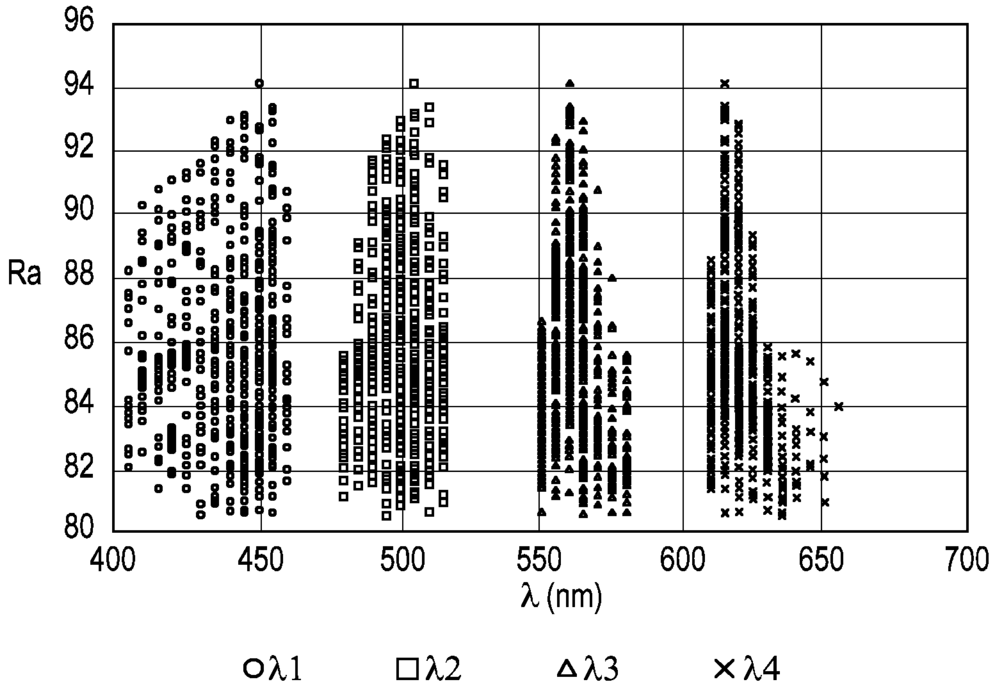
FIGS. 1*a*-1*c* schematically depicts some aspects and embodiments.

To find the optimal set of four wavelengths that supports very high CRI over the relevant CCT range (2700-6500K), we perform a colorimetric simulation. In the simulation, a light spectrum is created by selecting four wavelengths (each in a different waveband) and optimizing the intensity ratios of these wavelengths such that a target color point on the black body line (target CCT) is reached at the highest possible CRI. The assumption made here is that the emitters follow a step function, i.e. they only emit light in a 1 nm waveband. The number of possible combinations of these four wavelengths is very large, therefore in the simulation we first step through the wavebands at 5 nm intervals. FIG. 1*a* shows that many combinations of wavelengths lead to an average Ra>80.

Figure 1B:
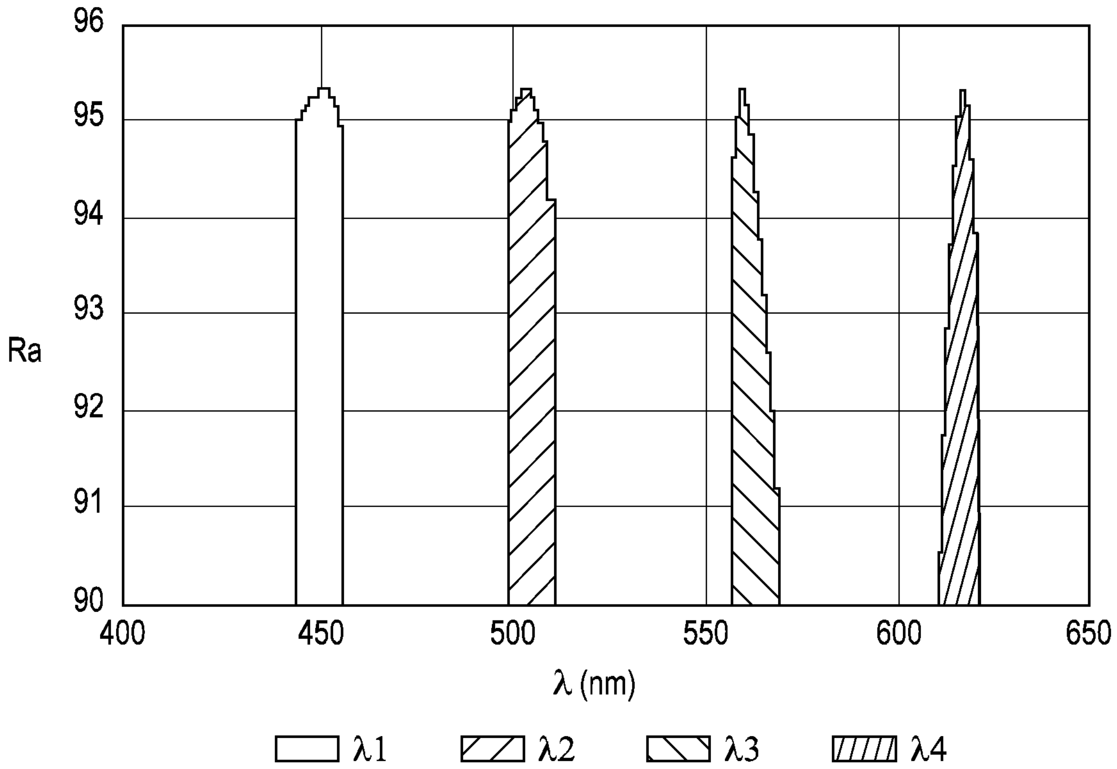

Subsequently, it was zoomed in on the peak wavelengths and the simulations were repeated at 1 nm intervals. FIG. 1*b* shows that there exist narrow wavebands for which the averaged Ra>90.

Figure 1C:
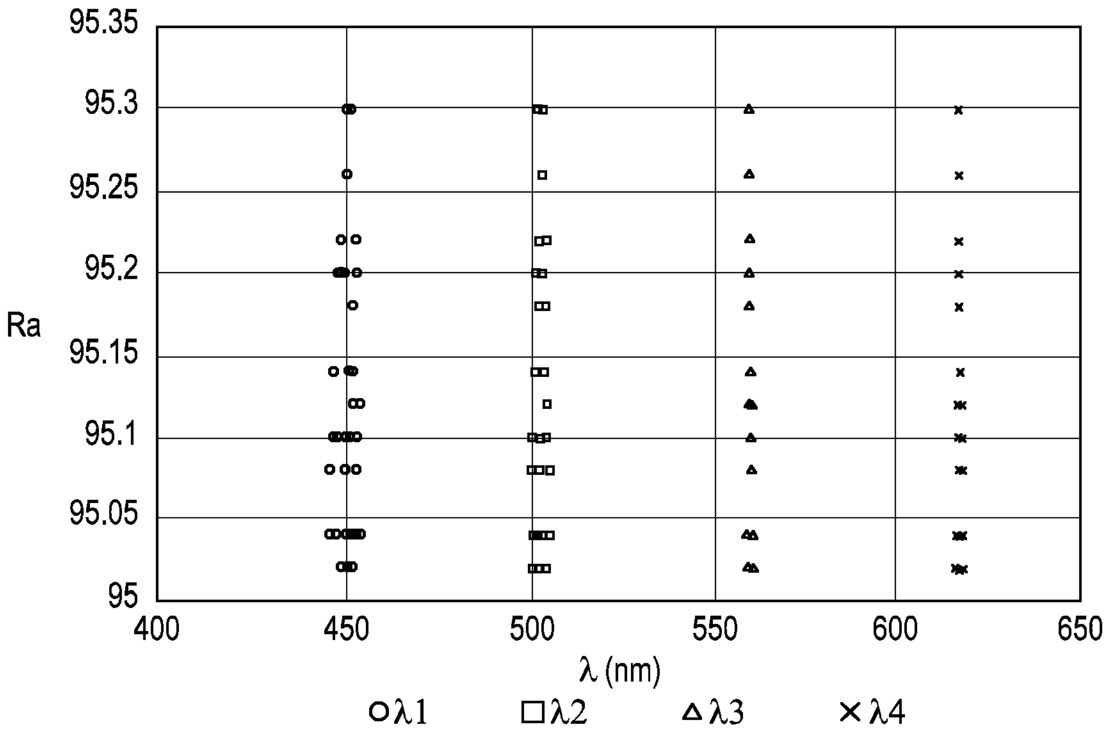

FIG. 1*b* also shows that the peaks of the averaged Ra are even higher than 95. FIG. 1*c* is showing only those combinations that have Ra>95. Note that the wavebands are further reduced.

So, we could claim that we can make light using four narrow-band emitters with very high CRI over the range 2700-6500K. The exact minimum CRI value would depend on the width of the wavebands that we specify from which the four center wavelengths are selected. The effect of this is shown in Table 1. In the top row we show the top solution with the highest average CRI. In the rows below we show how the minimum average CRI decreases when we allow the four wavelengths to be selected from increasing wavebands (Δλ) around the top solution. From the many possible wavelength combinations allowed in those wavebands (Δλ), we show the one having the lowest average CRI (Table 1) and the highest average CRI (Table 2).

TABLE 1a

Wavebands and minimum CRI values, for 1 nm step-function emitters (delta function); input data:

| Δλ | Wavebands (nm) λ1 | λ2 | λ3 | λ4 |
|---|---|---|---|---|
| 0 | 452 | 504 | 560 | 617 |
| 3 | 451-453 | 503-505 | 559-561 | 616-618 |
| 5 | 450-454 | 502-506 | 558-562 | 615-619 |
| 7 | 449-455 | 501-507 | 557-563 | 614-620 |
| 9 | 448-456 | 500-508 | 556-564 | 613-621 |
| 11 | 447-457 | 499-509 | 555-565 | 612-622 |

TABLE 1b

Wavebands and minimum CRI values, for 1 nm step-function emitters (delta function); results:

| Δλ | CRI Ra 2700K | 3000K | 4000K | 5000K | 6500K | lowest average |
|---|---|---|---|---|---|---|
| 0 | 95.02 | 95.83 | 95.79 | 95.30 | 94.63 | 95.31 |
| 3 | 93.48 | 93.27 | 92.8 | 92.75 | 91.92 | 92.84 |
| 5 | 88.54 | 88.19 | 87.87 | 88.04 | 87.2 | 87.97 |
| 7 | 82.25 | 82.74 | 82.96 | 83.07 | 82.87 | 82.78 |
| 9 | 80.69 | 80.42 | 80.41 | 80.84 | 80.18 | 80.51 |
| 11 | 80.25 | 80.51 | 80.39 | 80.41 | 80.16 | 80.34 |

Table 1 shows that the lowest average CRI found (last column) drops quickly below 95 when allowing wavelengths within these restricted wavebands around the top solution.

In practice, most narrow band light sources will emit light not only in a single wavelength. In Table 2 is shown how the top solution of Table 1 performs when assuming a Gaussian emission profile with varying bandwidth. Bandwidth is specified here in FWHM (Full Width at Half Maximum).

TABLE 2a

Center wavelengths and CRI values, for Gaussian emitters having variable bandwidth; input data:

| FWHM (nm) | Center wavelength (nm) λ1 | λ2 | λ3 | λ4 |
|---|---|---|---|---|
| 5 | 452 | 504 | 560 | 617 |
| 10 | 452 | 504 | 560 | 617 |
| 20 | 452 | 504 | 560 | 617 |
| 30 | 452 | 504 | 560 | 617 |
| 40 | 452 | 504 | 560 | 617 |

TABLE 2b

Center wavelengths and CRI values, for Gaussian emitters having variable bandwidth; results:

| CRI Ra 2700K | 3000K | 4000K | 5000K | 6500K | average |
|---|---|---|---|---|---|
| 94.96 | 95.84 | 95.94 | 95.48 | 94.81 | 95.41 |
| 95.02 | 95.83 | 95.78 | 95.3 | 94.63 | 95.31 |
| 94.14 | 95.27 | 96.55 | 96.82 | 96.61 | 95.89 |
| 92.86 | 93.88 | 95.35 | 95.89 | 96.29 | 94.85 |
| 90.31 | 91.58 | 93.5 | 94.25 | 94.83 | 92.89 |

Table 2 shows that for Gaussian emitters with center wavelengths of Table 1 (the best solution for step-function emitters), the average Ra drops below 95 for bandwidth FWHM of 30 and higher, see also FIG. 2*e*.

We note here that these results for Gaussian emitters can change a bit when allowing the center wavelengths to be varied, or when allowing different bandwidths for the four center wavelengths. One particular solution we show in Table 3, where the Ra value for the individual CCT values are all above 95. This result is only obtained for FWHM-20 nm.

TABLE 3a

Center wavelengths and CRI values, for Gaussian emitters with FWHM = 20 nm; input data:

| FWHM (nm) | Center wavelength (nm) λ1 | λ2 | λ3 | λ4 |
|---|---|---|---|---|
| 20 | 452 | 504 | 560 | 618 |
| 20 | 451 | 504 | 560 | 618 |
| 20 | 451 | 503 | 560 | 618 |
| 20 | 452 | 505 | 560 | 618 |
| 20 | 453 | 505 | 560 | 618 |
| 20 | 451 | 505 | 561 | 618 |
| 20 | 452 | 505 | 561 | 618 |
| 20 | 451 | 504 | 561 | 618 |
| 20 | 453 | 504 | 560 | 618 |
| 20 | 451 | 505 | 560 | 618 |
| 20 | 452 | 503 | 560 | 618 |
| 20 | 453 | 505 | 561 | 618 |
| 20 | 452 | 504 | 561 | 618 |

TABLE 3b

Center wavelengths and CRI values, for Gaussian emitters with FWHM = 20 nm; results:

| FWHM (nm) | CRI Ra 2700K | 3000K | 4000K | 5000K | 6500K | average |
|---|---|---|---|---|---|---|
| 20 | 95.24 | 96.3 | 97.31 | 97.1 | 96.37 | 96.46 |
| 20 | 95.23 | 96.31 | 97.46 | 96.89 | 96.43 | 96.46 |
| 20 | 95.13 | 96.17 | 97.22 | 97.17 | 96.54 | 96.45 |
| 20 | 95.23 | 96.25 | 97.36 | 96.88 | 96.18 | 96.38 |
| 20 | 95.27 | 96.3 | 97.24 | 96.93 | 96.13 | 96.37 |

TABLE 3b-continued

Center wavelengths and CRI values, for Gaussian emitters with FWHM = 20 nm; results:

| | CRI Ra | | | | | |
|---|---|---|---|---|---|---|
| FWHM (nm) | 2700K | 3000K | 4000K | 5000K | 6500K | average |
| 20 | 95.34 | 96.23 | 97.14 | 96.81 | 96.28 | 96.36 |
| 20 | 95.32 | 96.18 | 97 | 96.88 | 96.29 | 96.33 |
| 20 | 95.14 | 95.95 | 96.83 | 96.86 | 96.41 | 96.24 |
| 20 | 95.19 | 96.22 | 96.92 | 96.86 | 95.95 | 96.23 |
| 20 | 95.15 | 96.16 | 97.24 | 96.6 | 95.98 | 96.23 |
| 20 | 95.06 | 96.1 | 96.83 | 96.91 | 96.11 | 96.20 |
| 20 | 95.24 | 96.07 | 96.61 | 96.64 | 95.93 | 96.10 |
| 20 | 95.04 | 95.81 | 96.46 | 96.64 | 96.06 | 96.00 |

Given this, good results may be provided with a lighting system with (at least) 4 narrowband light sources (e.g. lasers, quantum dots), where the light sources have their emission peak around 452 nm, 504 nm, 560 nm, and 617.5 nm. These four wavelengths may also allow for tuning the CCT in the range 2700-6500K.

Figure 2A:
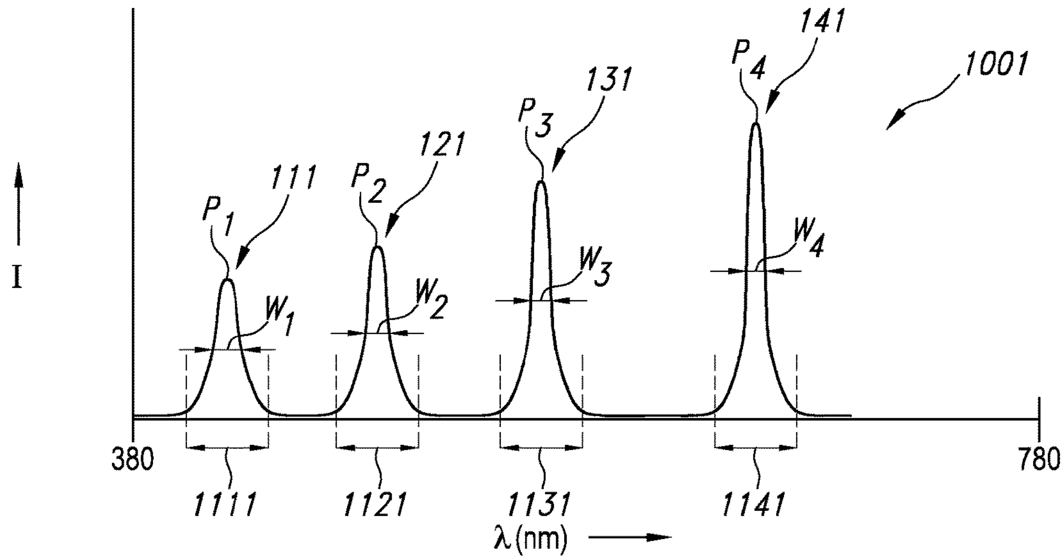
FIG. 2*a*-2*e* schematically depict some aspects and embodiments.

FIG. 2*a* schematically depicts a spectral power distribution of system light 1001 according to a possible embodiment. Note that the position of the bands do not necessarily reflect the actual wavelengths. Further, the indications of 380 nm and 780 nm are only used to indicate that in embodiments visible light is applied. The spectral power distribution may have at least about 75%, such as at least about 85% of the spectral power in emission bands 111, 121, 131, and 141 in four basic wavelengths. Here, essentially 100% of the spectral power is in the emission bands 111, 121, 131, and 141. The emission bands are in four basic wavelength ranges of each at maximum 50 nm width. The (respective) basic wavelength ranges are indicated with references 1111, 1121, 1131, and 1141. The emission bands have full width half maxima indicated with references W1, W2, W3, and W4, respectively. Especially, the emission bands 111, 121, 131, and 141 may have full width half maxima of at maximum 30 nm, such as at maximum about 14 nm, like at minimum about 8 nm. The x-axis indicates the wavelength in nanometer in the visible range, and the y-axis the spectral power in Watt. The emission bands have centroid wavelengths P1, P2, P3, and P4, respectively. At least three of the four basic wavelength ranges are selected from a first wavelength range of 452 nm+/−25 nm, a second wavelength range of 504 nm+/−25 nm, a third wavelength range of 560 nm+/−25 nm, and a fourth wavelength range of 617.5 nm+/−25 nm. In specific embodiments, the at least three of the four basic wavelength ranges are selected from the first wavelength range of 452 nm+/−25 nm, the second wavelength range of 504 nm+/−25 nm, and the third wavelength range of 560 nm+/−25 nm. The emission bands are schematically depicted and their intensities are not necessarily compliant with a mathematically correct example; it is a schematic drawing.

In specific embodiments, four of the four basic wavelength ranges are selected from the four basic wavelength ranges as defined in claim 1; and wherein one or more of the emission bands 111, 121, 131, 141 have a full width half maximum of at maximum 25 nm.

In specific embodiments, the four basic wavelength ranges are selected from a first wavelength range of 452 nm+/−15 nm, a second wavelength range of 504 nm+/−15 nm, a third wavelength range of 560 nm+/−15 nm, and a fourth wavelength range of 617.5 nm+/−15 nm. Even more especially, the four wavelength ranges are selected from a first wavelength range of 452 nm+/−10 nm, a second wavelength range of 504 nm+/−12 nm, a third wavelength range of 560 nm+/−11 nm, and a fourth wavelength range of 617.5 nm+/−13 nm.

Hence, in embodiments the centroid wavelengths of the four wavelength ranges may be selected from a first wavelength range of 452 nm+/−10 nm, a second wavelength range of 504 nm+/−12 nm, a third wavelength range of 560 nm+/−11 nm, and a fourth wavelength range of 617.5 nm+/−13 nm.

Further, in specific embodiments the light generating system 1000 may be configured to generate in the operational mode system light 1001 having a spectral power distribution with at least 95% of the spectral power in the emission bands 111, 121, 131, 141 (in the four basic wavelength ranges).

Figure 2B:
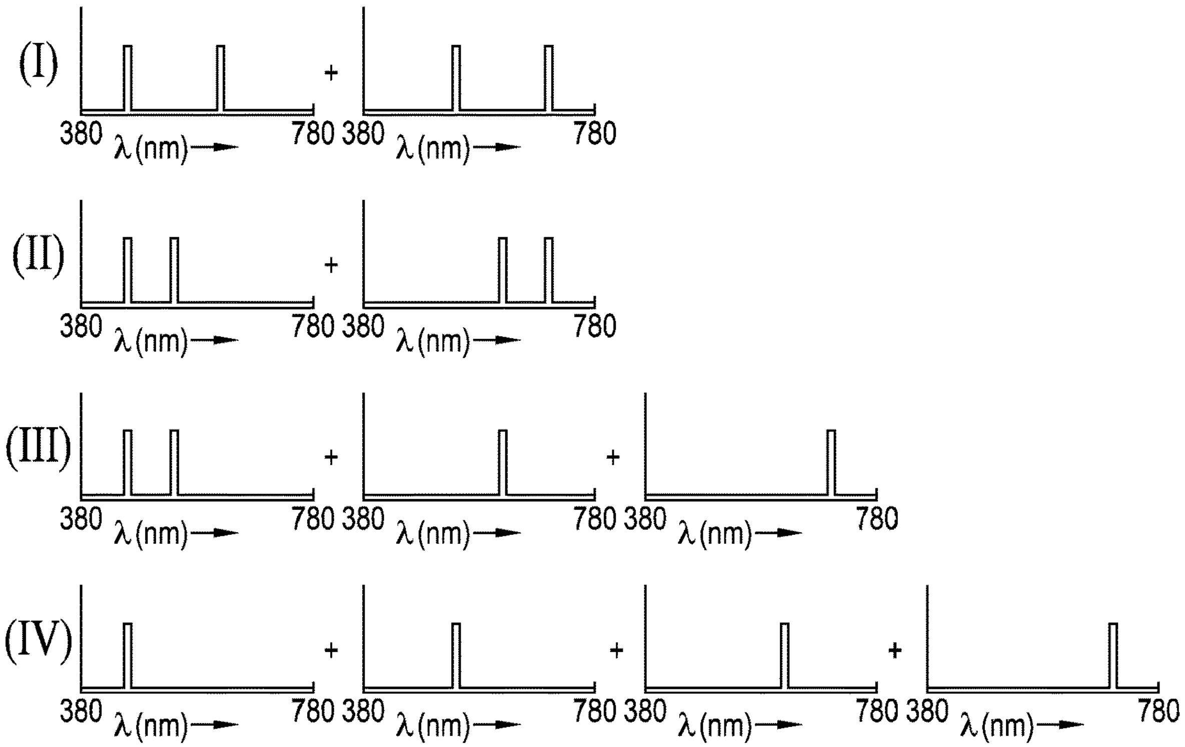

FIG. 2*b* very schematically depicts some embodiments how system light may be provided on the basis of different sources of light. Note that the position of the bands do not necessarily reflect the actual wavelengths. Further, the indications of 380 nm and 780 nm are only used to indicate that in embodiments visible light is applied. Embodiments I and II schematically shows two spectra, each comprising (the light of) two sources of light. Together, they may provide system light with four sources of light. Two different variants are shown. Embodiment III schematically shows three spectra, one comprising (the light of) two sources of light, and the other two each comprising (the light of) one source of light. Together, they may provide system light with four sources of light. Embodiment IV schematically shows four spectra, each comprising (the light of) one source of light. Together, they may provide system light with four sources of light. Hence, two, three, or four different light sources may provide system light with the four sources of light. Other embodiments than depicted may also be possible.

Figure 2C:
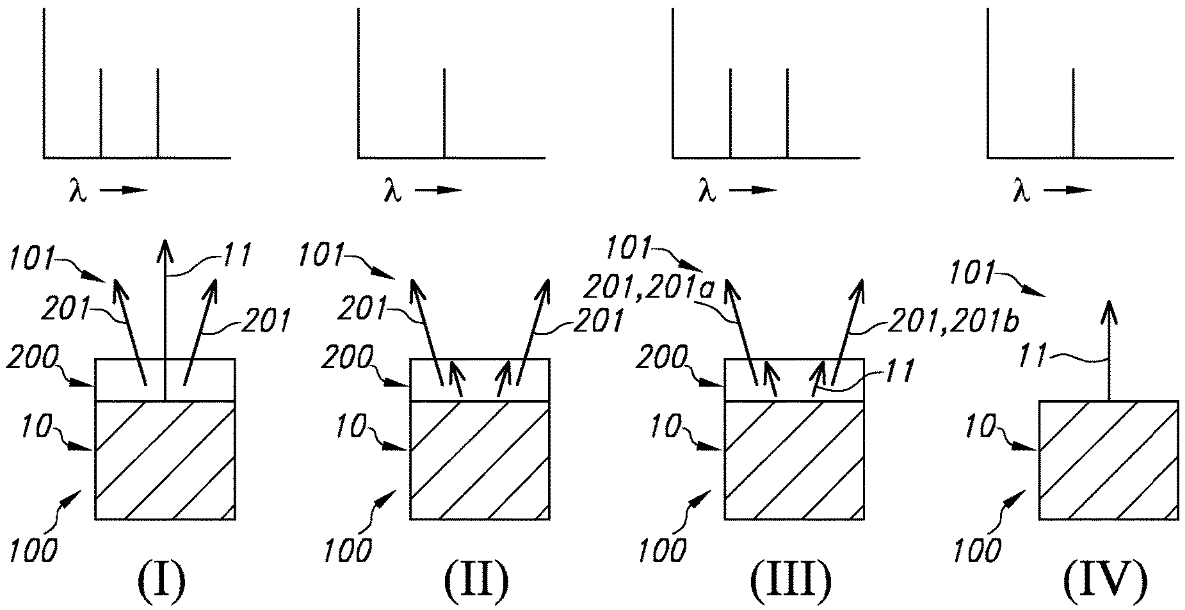

FIG. 2*c* schematically depict some embodiments of sources of light. These non-limiting examples may apply for each of the sources of light individually (see e.g. embodiments I and IV), or for combinations of sources of light (see e.g. embodiments II and III). Embodiment I schematically depicts a light source 10 in combination with a luminescent material 200. The light source 10 generates light source light 11, which may be partly converted into luminescent material light 201. Together, they may provide (the light of) two sources of light. Here, in FIG. 2*c*, the source of light is indicated with a general reference 100, which may refer to one or more sources of light, and which may represent any of the possible (four) sources of light 110,120,130,140 (see e.g. FIG. 2). The light of the source of light 100 is indicated with reference 101, and may thus refer to any of the of the spectral power distributions 111,121,131,141 (see also e.g. FIG. 2). The light 101 may in embodiments comprise one or more of light source light 11 and luminescent material light 201. Embodiment II schematically depicts a similar embodiment as embodiment I, but in this embodiment essentially all light source light 11 is converted into luminescent material light 201. Hence, this light source 10 in combination with the luminescent material 200 may provide (the light of) a single source of light. Embodiment III schematically depicts a similar embodiment as embodiment II, but in this embodiment essentially all light source light 11 is converted into luminescent material light 201. However, here the luminescent material 200 comprises two different types of luminescent material, leading to different types of luminescent material light 201, indicated with references 202*a* and 202*b*, respectively. These different types of luminescent material light 202*a*,202*b* may refer to different spectral power distribution of the luminescent material light. Hence, this light source 10 in combination with the luminescent material 200 may provide (the light of) two sources of light. Embodiments I-III may e.g. be PC LEDs, or lasers in combination with luminescent material. However, also a direct or laser as such may be used (though the laser may also be based on a luminescent material, e.g. in combination with an upconverter), or a narrow-band LED, or a laser diode, etc. This is schematically depicted in embodiment IV of FIG. 2*c*.

Figure 2D:
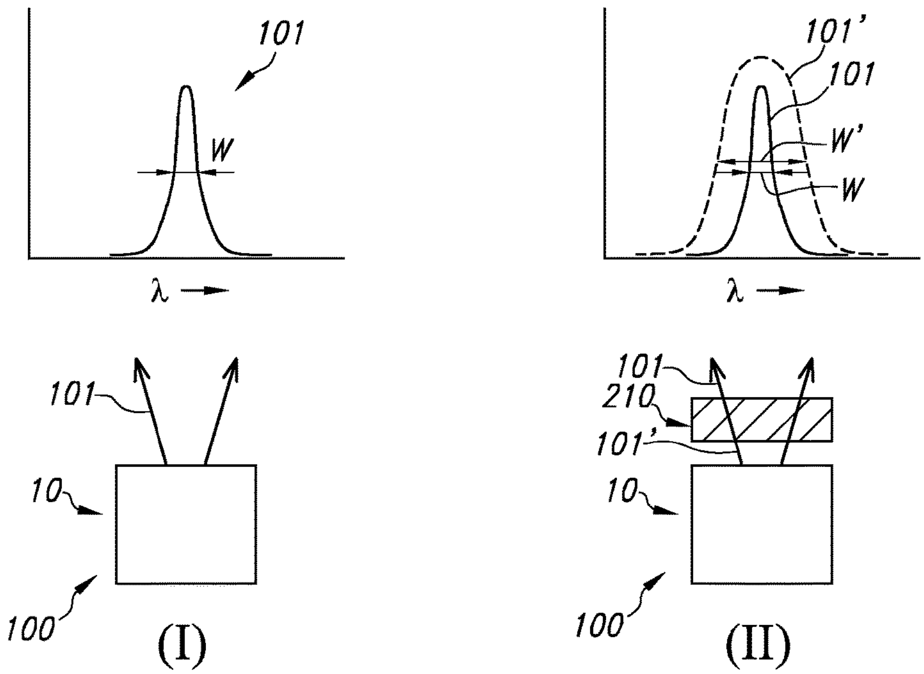
Figure 2E:
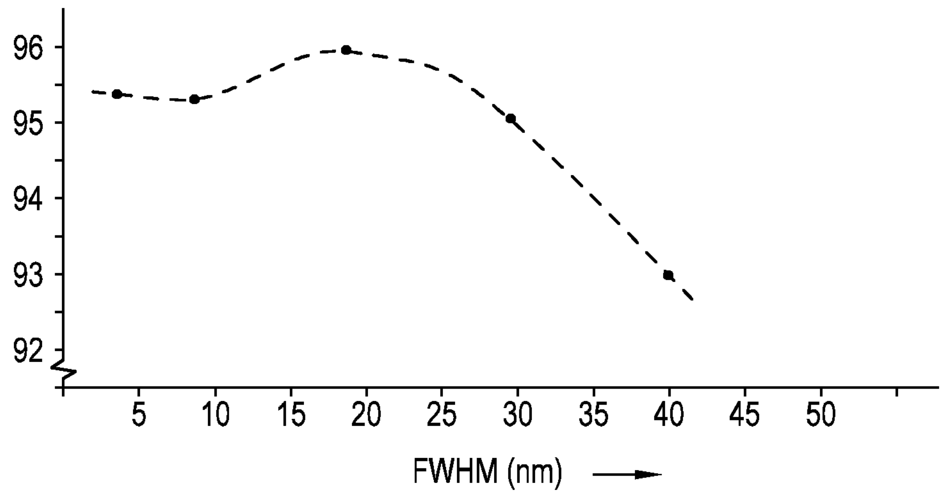

FIG. 2*d* schematically depicts with embodiments I and II that the light generated by the light source (optionally in combination with a luminescent material), which light is herein indicated with reference 101, may have the right position and the right bandwidth W within at least one of the basis wavelength ranges, see embodiment I. As also indicated in relation to FIG. 2*c*, the light source 10 may be a source of light 100, configured to generate light 101 have one or more of the herein indicated spectral power distributions, and which may comprise one or more of light source light and luminescent material light. However, the light generated by the source of light may in yet other embodiments obtain this after optical filtering with first optics 210, see embodiments II. In the latter embodiment, light of the source of light 100 after optical filtering may be indicated as light 101 of the source of light 100; light of the source of light 100 before being filtered by the first optics 210 is indicated with reference 101' In this schematically depicted embodiment II of FIG. 2*d*, the optical filter 210 reduces the width (from w' of the light 101' to W of the light 101).

As indicated above, simulations were done on the full width half maximum of the spectral power distribution of the sources of light, assuming four emission bands in the herein described wavelength ranges. FIG. 2*e* shows the color rendering as a function of the spectral bandwidth, wherein in the x-axis the FWHM in nanometers is shown, and he curve CRI indicates the CRI as function of the wavelength.

Figure 3:
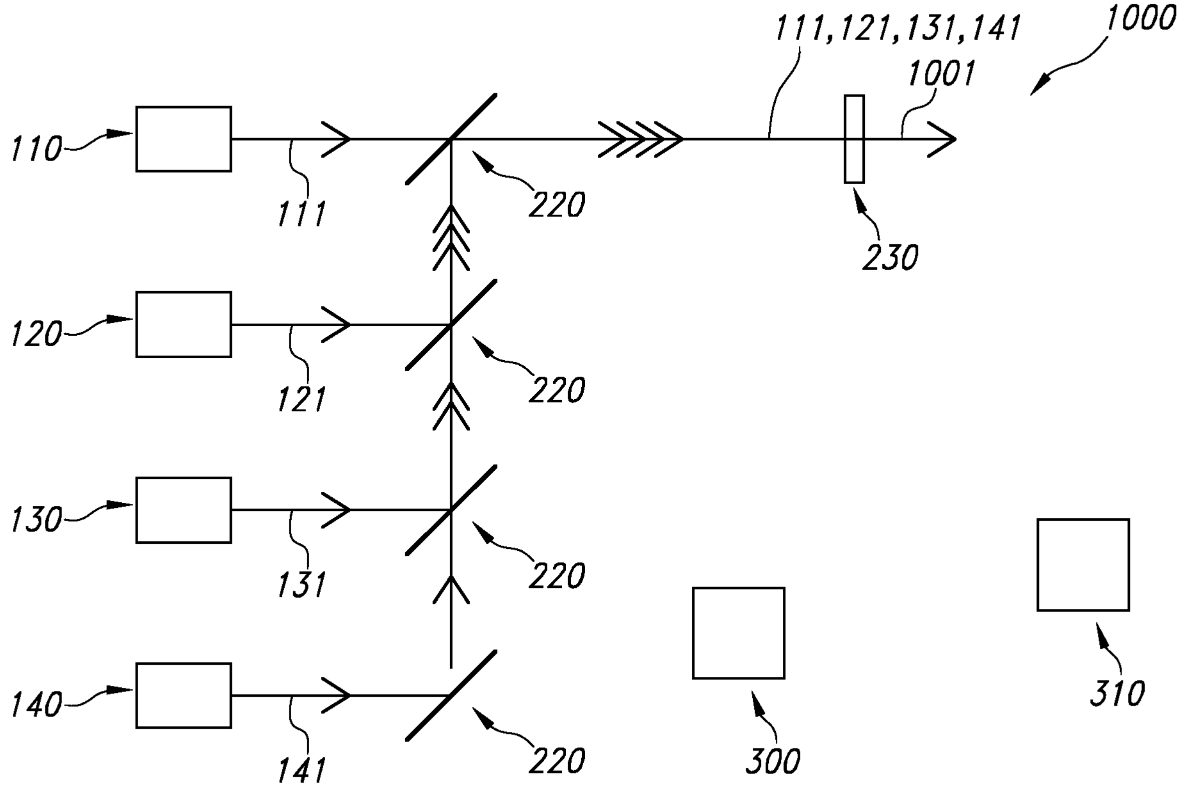
FIG. 3 and FIG. 4 schematically depicts embodiments of application.

FIG. 3 schematically depicts an embodiment of the system 1000. Especially, the light generating system 1000 is configured to generate in an operational mode system light 1001. As indicated above, the system light 1001 may have a spectral power distribution with at least 85% of the spectral power in emission bands 111, 121, 131, 141 in four basic wavelength ranges of each at maximum 50 nm width. At least three of the four basic wavelength ranges may be selected from a first wavelength range of 452 nm+/−25 nm, a second wavelength range of 504 nm+/−25 nm, a third wavelength range of 560 nm+/−25 nm, and a fourth wavelength range of 617.5 nm+/−25 nm, wherein the emission bands 111, 121, 131, 141 have full width half maxima of at maximum 30 nm.

FIG. 3 schematically depicts an embodiment comprising four sources of light 110,120,130,140 configured to generate the emission bands 111, 121, 131, 141.

In embodiments, one or more of the four sources of light 110,120, 130,140 comprise laser light sources. Alternatively or additionally, one or more of the four sources of light 110,120, 130,140 comprise quantum structure based light sources. Alternatively or additionally, one or more of the four sources of light 110,120,130,140 comprise a light source selected from a LED, a phosphor converted LED, and a superluminescent diode, optionally in combination with first optics (see e.g. FIG. 2*c*), wherein the first optics are configured to narrow the beam width of the respective source of light 110,120,130, 140.

Especially, in embodiments a first source of light 110 is configured to generate the first emission band 111 having a centroid wavelength selected from the wavelength range of 449-455 nm, a second source of light 120 is configured to generate the second emission band 121 having a centroid wavelength selected from the wavelength range of 499-509 nm, a third source of light 130 is configured to generate the third emission band 131 having a centroid wavelength selected from the wavelength range of 555-565 nm, and a fourth source of light 140 is configured to generate the fourth emission band 141 having a centroid wavelength selected from the wavelength range of 612-623 nm.

As schematically depicted, the light generating system 1000 may further comprise second optics 220, configured to combine two or more beams of light of two or more of the four sources of light 110, 120, 130, 140, and/or third optics 230 configured downstream of the sources of light 110, 120, 130, 140. The second optics 220 may have (mutually) different characteristics, as they are each combining different types of emission bands; hence, they may have different transmission and/or reflection properties. The third optics 230 may comprise a beam shaping element selected from the group of diffusors and collimators.

In embodiments, the light generating system may further comprise a control system 300. The control system 300 may be configured to control one or more of the spectral power distribution, the color rendering index, the color point, and the correlated color temperature of the system light 1001. For instance, in embodiments the control system 300 may be configured to control one or more of the spectral power distribution, the color rendering index, and the color point, of the system light 1001 while maintaining the correlated color temperature within a range of 2700-6500 K. For instance, in specific embodiments the control system 300 may be configured to control one or more of the spectral power distribution, the color rendering index, the color point, and the correlated color temperature of the system light 1001 in dependence of a sensor signal of a sensor 310. Especially, the sensor 310 comprises an optical sensor. The sensor 310 may be comprised by the system 1000 or may be functionally coupled to the system 1000.

Hence, FIG. 3 may for instance schematically show an example of how to optically combine the light from 4 lasers. Other ways of laser light combining using dichroic elements, X-cubes, polarization beam combiners may also be possible. Additional optical elements can be placed in the light output part to further mix and homogenize output of four laser channels (using mixing rods, light pipes, micro-optical and holographic diffuser elements).

To tune the CCT of the emitted light mixture, the intensity ratios of the 4 wavelengths may be changed in a pre-calculated way. This can be done either by changing the duty cycle of modulation or by changing the driving current of individual channels in continuous operation mode.

Figure 4:
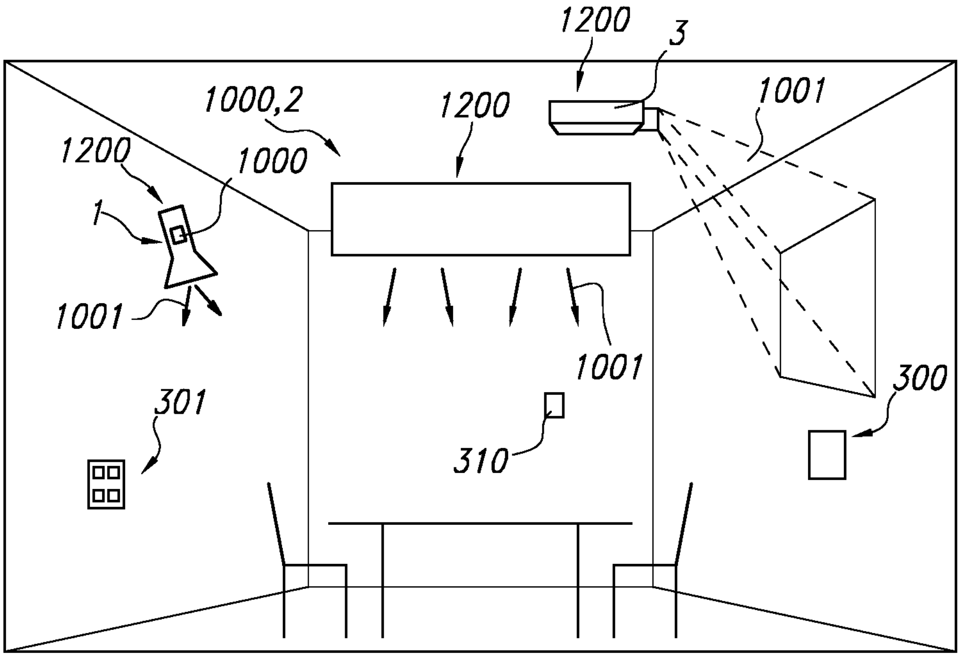

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 4 also schematically depicts an embodiment of lamp 1 comprising the light generating system 1000. Reference 3 indicates a projector device or projector system, which may be used to project images, such as at a wall, which may also comprise the light generating system 1000. Hence, FIG. 4 schematically depicts embodiments of a light generating device 1200 selected from the group of a lamp 1, a luminaire 2, a projector device 3, comprising the light generating system 1000.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system configured to generate in an operational mode system light having a spectral power distribution with at least 85% of the spectral power in emission bands in four basic wavelength ranges of each at maximum 50 nm width, wherein four basic wavelength ranges are selected from a first wavelength range of 452 nm+/−25 nm, a second wavelength range of 504 nm+/−25 nm, a third wavelength range of 560 nm+/−25 nm, and a fourth wavelength range of 617.5 nm+/−25 nm, wherein the emission bands have full width half maxima of at maximum 30 nm, wherein the light generating system is further configured to generate the operational mode white system light having a correlated color temperature (CCT) between 2700-6500 K and having a color rendering index (CRI) of at least 90, the light generating system comprising four sources of light configured to generate the emission bands, wherein a first source of light is configured to generate the first emission band having a centroid wavelength selected from the wavelength range of 449-455 nm, wherein a fourth source of light is configured to generate the fourth emission band having a centroid wavelength selected from the wavelength range of 612-623 nm.

2. The light generating system according to claim 1, wherein four of the four basic wavelength ranges are selected from the four basic wavelength ranges.

3. The light generating system according to claim 1, wherein the four basic wavelength ranges are selected from a first wavelength range of 452 nm+/−15 nm, a second wavelength range of 504 nm+/−15 nm, a third wavelength range of 560 nm+/−15 nm, and a fourth wavelength range of 617.5 nm+/−15 nm.

4. The light generating system according to claim 1, wherein the four wavelength ranges are selected from a first wavelength range of 452 nm+/−10 nm, a second wavelength range of 504 nm+/−12 nm, a third wavelength range of 560 nm+/−11 nm, and a fourth wavelength range of 617.5 nm+/−13 nm.

5. The light generating system according to claim 1, wherein the light generating system is configured to generate in the operational mode system light having a spectral power distribution with at least 95% of the spectral power in the emission bands; and wherein the four wavelength ranges are selected from a first wavelength range of 452 nm+/−5 nm, a second wavelength range of 504 nm+/−5 nm, a third wavelength range of 560 nm+/−5 nm, and a fourth wavelength range of 617.5 nm+/−5 nm.

6. The light generating system according to claim 1, comprising four sources of light configured to generate the emission bands.

7. The light generating system according to claim 1, wherein one or more of the four sources of light comprise laser light sources.

8. The light generating system according to claim 1, wherein one or more of the four sources of light comprise quantum structure based light sources.

9. The light generating system according to claim 1, wherein one or more of the four sources of light comprise a light source selected from a LED, a phosphor converted LED, and a superluminescent diode, optionally in combination with first optics, wherein the first optics are configured to narrow the beam width of the respective source of light.

10. The light generating system according to claim 6, wherein a the emission bands have full width half maxima selected from the range of 0.5-15 nm.

11. The light generating system according to claim 1, further comprising second optics, configured to combine two or more beams of light of two or more of the four sources of light, and third optics configured downstream of the sources of light, wherein the third optics comprises a beam shaping element selected from the group of diffusors and collimators.

12. The light generating system according to claim 1, further comprising a control system, wherein the control system is configured to control one or more of the spectral power distribution, the color rendering index, the color point, and the correlated color temperature of the system light.

13. The light generating system according to claim 12, wherein the control system is configured to control one or more of the spectral power distribution, the color rendering index, and the color point, of the system light while maintaining the correlated color temperature within a range of 2700-6500 K.

14. The light generating system according to claim 12, wherein the control system is configured to control one or more of the spectral power distribution, the color rendering index, the color point, and the correlated color temperature of the system light in dependence of a sensor signal of a sensor, wherein the sensor comprises an optical sensor.

15. A light generating device selected from the group of a lamp, a luminaire, a projector device, comprising the light generating system according to claim 1.

* * * * *